United States Patent [19]

Hunsberger

[11] Patent Number: 5,096,476

[45] Date of Patent: Mar. 17, 1992

[54] FILTER BAG SEAL SYSTEM

[75] Inventor: Lewis E. Hunsberger, Mukilteo, Wash.

[73] Assignee: H & R Mechanical Systems, Inc., Everett, Wash.

[21] Appl. No.: 455,947

[22] Filed: Dec. 22, 1989

[51] Int. Cl.[5] .................................. B01D 46/02
[52] U.S. Cl. ..................... 55/341.1; 55/379
[58] Field of Search ........................ 55/341.1, 379

[56] References Cited

U.S. PATENT DOCUMENTS

| | | | |
|---|---|---|---|
| 540,720 | 6/1895 | Clark | 55/302 |
| 735,904 | 8/1903 | Picher | 55/341.1 |
| 827,460 | 7/1906 | Morse | 55/287 |
| 1,084,933 | 1/1914 | Feeny | 55/341.1 |
| 1,703,681 | 2/1929 | Miller | 55/341.1 |
| 2,369,649 | 7/1942 | Abrams | 55/287 |
| 2,976,953 | 3/1961 | Haas et al. | 55/287 |
| 3,120,432 | 2/1964 | Aldrich | 55/315 |
| 3,170,777 | 2/1965 | Held | 55/379 |
| 3,373,545 | 3/1968 | Christianson | 55/273 |
| 3,377,783 | 4/1968 | Young | 55/302 |
| 3,406,502 | 10/1968 | Wiik | 55/341.1 |
| 3,844,750 | 10/1974 | Ray | 55/379 |
| 3,854,910 | 12/1974 | Hammerquist | 55/287 |
| 3,871,845 | 3/1975 | Clarke et al. | 55/284 |
| 3,942,962 | 3/1976 | Duyckinck | 55/302 |
| 4,014,672 | 3/1977 | Jansson | 55/379 |
| 4,194,894 | 3/1980 | Noland | 55/379 |
| 4,198,216 | 4/1980 | Wilhelmsson | 55/341.1 |
| 4,202,677 | 5/1980 | Clarke et al. | 55/378 |
| 4,220,459 | 9/1980 | Hammond et al. | 55/379 |
| 4,290,790 | 9/1981 | Okubo | 55/379 |
| 4,303,425 | 12/1981 | Cox, Jr. | 55/378 |
| 4,336,035 | 6/1982 | Evenstad et al. | 55/379 |
| 4,343,632 | 8/1982 | Margraf | 55/341 |

OTHER PUBLICATIONS

Brochure entitled FILTREX by Steelcraft Corporation.
Brochure entitled "Ray-Jet Reverse Air Dust Collector" by C-E Air Preheater Combustion Engineering, Inc., 1978.
Brochure entitled "Controlled Fire Filter" by MAC Equipment, Inc.
Brochure entitled "Rolfes RA Reverse Air Dust Collectors" by George A. Rolfes Company.

Primary Examiner—Jay H. Woo
Assistant Examiner—C. Scott Bushey
Attorney, Agent, or Firm—Christensen, O'Connor, Johnson & Kindness

[57] ABSTRACT

A bag house (10) is composed of a plurality of filter bags (44) each engaged over the substantially open support frame (46). A solid band (98) defines a lower edge of the support frame (46). One or more elastic seals (90) are rolled over the lower end (106) of the bag (44) which surrounds the band (98). The assembled seals (90), filter bag (44) and frame (46) are then simply inserted downwardly into a circular receiving collar (40) surrounding an opening (38) through which flows gas laden with particulate matter. The particulate matter is collected by the filter bag (44) while the filtered air is allowed to flow through the air previous bag.

25 Claims, 4 Drawing Sheets

FILTER BAG SEAL SYSTEM

TECHNICAL FIELD

The present invention relates to filtering systems and, more particularly, to a filter bag seal system for a bag house for forming a substantially airtight interconnection between a filter bag and an opening supplying air to the filter bag.

BACKGROUND OF THE INVENTION

A filtering apparatus known as a bag house is employed in a myriad of industrial applications to separate particulate matter from a gaseous stream. Perhaps most commonly, the gaseous stream is air. A typical bag house contains a partitioned filtering chamber which houses numerous filter bags in airflow communication, through corresponding openings in the partition, with a source of unfiltered air containing suspended particulate matter. Within a single bag house, a large number of filter bags may be used. The filter bags are usually constructed of an air pervious fabric material which allows the air to pass through while trapping the suspended particulate matter. Most bag houses are designed with filter bag cleaning systems which attempt to periodically or continuously remove particulate matter that accumulates on the filter bags. Various types of filter bag cleaning systems have been proposed, including those shown in U.S. Pat. Nos. 540,720; 2,369,649; 3,854,910; 3,871,845; and 4,343,632.

In a typical bag house design, each filter bag is normally in the form of an elongated tube disposed over an open support frame to prevent the bag from collapsing. Both the filter bag may be attached to a collar surrounding an opening in the partition and extending into the filtering chamber. Attachment of the bag to the collar may be accomplished for instance, by a band clamp or other type of ring encircling the portion of the bag engaged over the collar. The use of such band clamp devices to attach a filter bag to the partition collar possesses certain disadvantages. For instance, because the filter bag tends to bunch at the point at which the band is being tightened, an airtight seal is not achieved which may allow a portion of the unfiltered air to escape at this point of attachment. Further, removing and installing filter bags with this type of attachment device has proven to be an extremely labor intensive and time consuming process, since each clamp must be loosened to remove the filter bag and then retightened to reinstate the bag.

Removal and installation of filter bags is not restricted to the replacement of worn out bags; the filter bags must also be dismantled and removed to gain access to the interior of the bag house, for instance, to make repairs in or around the filtering chamber. Given the frequency of filter bag removal and/or replacement operations and the large number of bags used in each bag house, significant process down time can result.

As a result, there has been a long-felt need for a system of installing bags in a bag house that is simple and inexpensive, that allows the filter bags to be quickly and easily removed and installed, and that provides an efficient, airtight seal at the point of attachment. The present invention is directed to satisfying this need.

SUMMARY OF THE INVENTION

In accordance with the present invention, filter bag seal systems for bag houses are disclosed. The bag house environment to which this invention is directed includes a partitioned filtering chamber with at least one opening in the partition in airflow communication with the filter chamber. The opening in the partition is surrounded by a receiving collar.

The filter bag seal system includes an elongated, air previous filter bag supported against collapse by a frame disposed within the filter bag. The bag is open at one end and closed at the other. A solid band, which may or may not be fixed to the frame, is sized to be receivable within the open end of the bag. The band is also sized so that the band together with the surrounding bag open end are together receivable within the collar and define a clearance gap from the collar.

An elastic seal member extends snugly around the filter bag and the band to secure the open end of the filter bag to the exterior of the band. The elastic seal member has a thickness greater than the gap between the inside of the receiving collar and the outside of the combined band and open end of the filter bag. The filter bag and band are installed by simply slidably inserting the bag and band within the receiving collar. The elastic seal member forms a substantially, if not completely, airtight interconnection between the band/bag and the receiving collar. No other connector or method is needed to maintain the filter bag and associated band locked in engagement with the receiving collar while still permitting the filter bag and associated band from being detached from the receiving collar by simply sliding the bag and band out from within the receiving collar.

In accordance with a further aspect of the present invention, a plurality of elastic seal members extend around the band and the surrounding open end of the filter bag.

In accordance with another aspect of the present invention, the elastic seal member consists of an O-ring constructed of a material possessing substantial resiliency and capable of withstanding elevated temperatures.

As will be readily appreciated from the following description, the filter bag seal system formed in accordance with the invention is an efficient design and inexpensive construction. The elastic seal member, which is easily engaged over the band and surrounding filter bag, provides a seal arrangement that is quickly and conveniently removed or installed, while also providing a substantially if not completely airtight seal at the point of attachment.

BRIEF DESCRIPTION OF THE DRAWINGS

The foregoing and other features and advantages of the present invention will become more readily appreciated as the same becomes better understood by reference to the following description of a preferred embodiment of the invention and the accompanying drawings wherein.

DESCRIPTION OF THE PREFERRED EMBODIMENT

Figure 1:
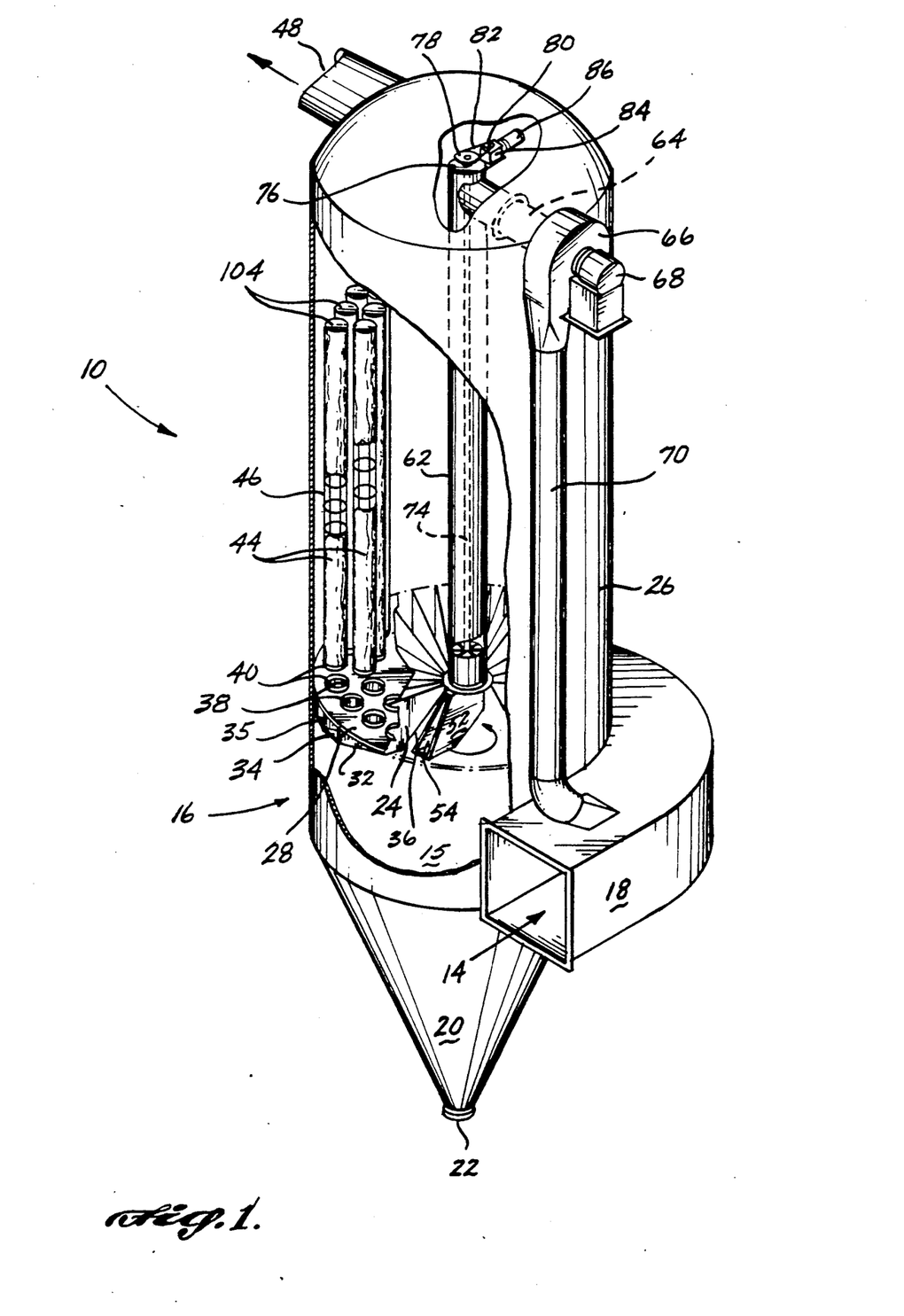
FIG. 1 is an environmental isometric view of a bag house arrangement utilizing the filter bag seal system constructed in accordance with the invention.

FIG. 1 illustrates a bag house 10 in which a preferred embodiment of a filter bag seal system 12 constructed in accordance with the present invention is applied. Unfiltered gas, e.g., air 14, enters a cyclone 16 located beneath the bag house 10 through inlet duct 18. The cyclone 16 includes a funnel-shaped lower portion 20 that terminates at a bottom exit opening 22. A plurality of sector plates 24 are radially disposed about the lower portion of the bag house cylindrical housing 26 at an elevation above the cyclone 16 and immediately below a circular floor portion 28. The portion of the bag house above the floor portion 28 composes a filter chamber 30. The bottom edges 32 of the sector plates 24 are sloped upwardly in the radially outward direction, with the bottom edges 32 of adjacent sector plates being spanned by a sloping floor plate 34. The outward edges 35 of the sector plates 24 abut against the bag house cylindrical housing 26. Only the inward edges 36 of the sector plates 24 are not closed off.

Figure 2:
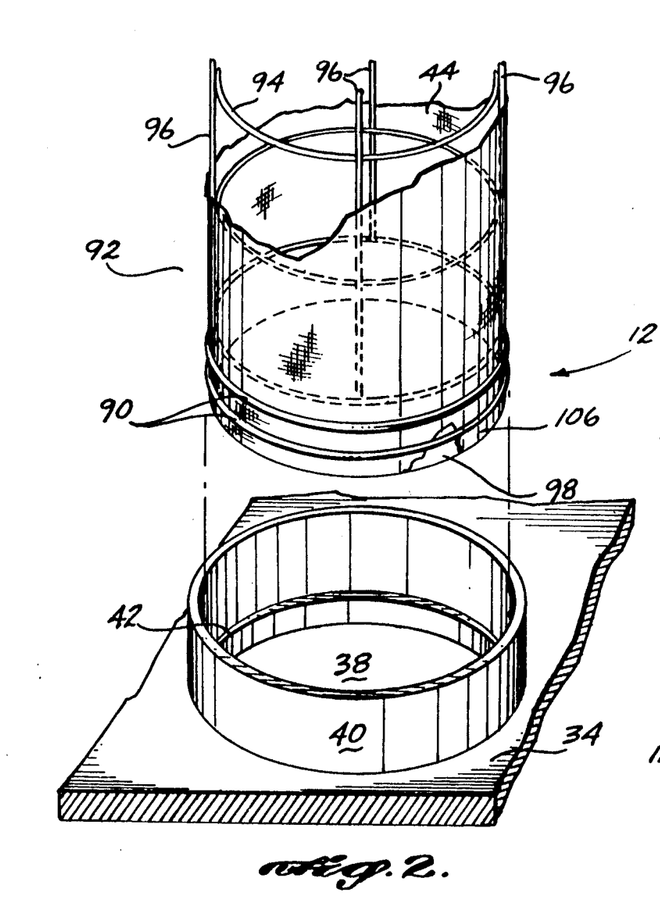
FIG. 2 is an enlarged, fragmentary isometric view of the filter bag seal system prior to insertion into a receiving collar.
Figure 3:
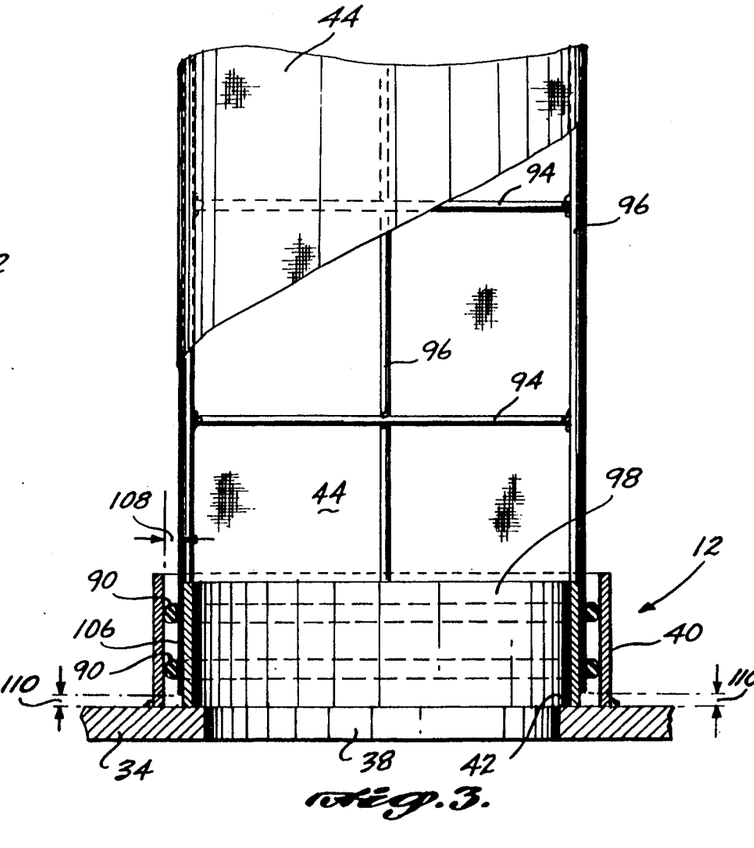
FIG. 3 is an enlarged, fragmentary cross-sectional view of the filter bag seal system of the present invention shown in side elevation after insertion into a receiving collar.

Each pair of adjacent sector plates 24 together with their corresponding floor plates 34 define an air passageway 37 in air flow communication with one or more circular openings 38 formed in the floor partition 28 at locations between the adjacent sector plates 24. A receiving collar 40 encircles each opening 38, which collar is somewhat larger in diameter than the opening so as to form a ledge 42 around each opening 38. As shown in FIGS. 2 and 3, the collar 40 extends upwardly from the upper surface of the floor partition 28. The collars 40 are sized to receive the lower, open end of an upwardly elongated, air pervious filter bag 44 which is engaged over an open frame 46.

The larger particles of suspended particulate matter, known as heavies, that enter the cyclone 16 fall downwardly due to gravitational forces and pass out of the cyclone through the bottom outlet opening 22. The lighter particulate matter, or fines, travel upwardly through the cyclone, passing between the forward edges 36 of the sector plates 24 and through the openings 38 of the partition floor 28. The fines are collected within the filter bags 44. Since the filter bags are pervious to the air but not the particulate matter, the air passes out through the bags and out of the top of the housing 26 through an outlet opening 48.

The lighter particulate matter collects on the inside surfaces of the filter bags 44 and eventually builds or cakes up. To keep the filter bags 44 from becoming clogged, yet allowing the bag house 10 to operate continuously, a cleaning system is employed. The cleaning system includes a rotating suction cleaning head 52 having closed back and bottom portions and a radially outward opening 54 defined by the sidewalls 56 and the bottom wall 58 of the head. The radially outward edges 60 of the sidewalls 56 are sloped to closely match the inward edges 36 of the sector plates 24. The width across the opening 54 is tapered in the upward direction to closely match the opening formed between two adjacent sector plates 24 as defined by the inward edges 36 of the sector plates.

The suction head 52 is disposed in airflow communication and rotates about the lower end of a central suction tube 62 extending upwardly to the top of the bag house housing 26. The top of the suction tube 62 is interconnected with a radially inward end of a horizontally disposed tube 64, with the outer end of the tube connected to the inlet side of an air suction fan 66 which is powered by an electric motor 68. The outlet side of the fan 66 is connected to the downwardly extending pipe 70. The lower end of the pipe 70 is connected in an airflow receiving communication with the inlet duct 18 of the cyclone 16.

The suction head 52 is rotated within the lower end of the stationary, vertical suction tube 62 by a vertical drive shaft 74 disposed within the interior of the suction tube 62. The upper end of the drive shaft 74 extends upwardly through a central opening formed in a cap 76 that closes off the upper end of suction tube 62. A driven pulley 78 is mounted on the portion of the drive shaft 74 extending above the cap 76. The driven pulley 78 is driven by a drive pulley 80 through a belt 82. The drive pulley 80 is mounted on a powered shaft extending vertically upwardly from a drive box 84 which in turn is powered by an electric motor 86.

The electric motor 86 may be controlled to continuously rotate the suction head 52 so that the suction head opening 54 passes closely adjacent the inward edges 36 of the sector plates 24. This enables a substantial suction to be applied to the passageway 37 defined by the sector plates 24 with which the suction head 52 is in registry, which suction in turn is applied to corresponding floor plate openings 38. The resulting suction force imposed within the associated filter bags 44 causes the filter bags to collapse inwardly against their corresponding frames 46. As a result, the caked-on particulate matter falls away from the inside surface of the filter bags and downwardly through the floor plate openings 38, between adjacent sector plates 24 and into the suction head 52.

From the suction head 52, the removed particulate matter flows upwardly through the suction tube 62, radially through the horizontal tube 64, through the suction fan 66 and then downwardly through the outlet pipe 70 and into the inlet 18 of the cyclone 16. Most of this particulate matter then falls downwardly into the cyclone funnel 20 and out through the bottom opening 22 thereof.

It will be appreciated that rather than continuously rotating the suction head 52, the motor 86 and/or the drive box 84 may be controlled to intermittently rotate the suction head 52 so that the suction head is maintained in registry with an air passageway 37 defined by adjacent sector plates 24 for a desired length of time, and then rotated to be in registry with the next adjacent air passage 37 defined by one of the two "original" sector plates and the next adjacent sector plate. By this intermittent movement of the suction head 52, the suction provided by the suction head is applied to corresponding filter bags 44 for the period of time needed to remove substantially all of the particulate matter which has collected on the inside surface of the filter bags.

Referring also to FIGS. 2 and 3, a preferred embodiment of a filter bag seal system 12 constructed in accordance with the present invention is shown. In essence, the filter bag seal system 12 functions to connect the filter bags 44 to an associated receiving collar 40. The filter bag seal system 12 includes a receiving collar 40, an elongated filter bag frame 46, a filter bag 44, and at least one elastic seal member 90.

As noted above, the receiving collar 40 is disposed within the filtering chamber 30 and surrounds an opening 38. The receiving collar 40 extends orthogonally from the upper surface of floor partition 28 and terminates at an elevation sufficient to create a receptacle for holding the frame 46 and filter bag 44. The receiving collar 40 may be secured to the upper surface of the floor partition 28 by any convenient method, e.g., by weldments, hardware members, etc.

The filter bag frames 46 are of elongated cylindrical shape having open lower ends 92 sized to be receivable within corresponding receiving collars 40 and upper ends located distal from the lower ends 92. As shown in FIGS. 2 and 3, in a preferred embodiment of the present invention, the frame 46 is composed of a wire mesh construction having a series of vertically spaced apart circular hoops 94 interconnected by a plurality of longitudinally extending rods 96. The rods 96 are circumferentially spaced about the hoops. The bottom end of the frame 46 is formed with a circular band 98 having a diameter substantially the same as the frame. Ideally, the lower ends of the rods 96 of the frame 46 are fixedly attached to the top edge of the band 98. The band 98 has a height in the direction longitudinally along the frame 46 that is substantially equal to the orthogonal distance, or height, that the receiving collar 40 extends from upper surface of the floor partition 28.

Wire mesh construction of the frame 46 minimizes the weight of the frame while still providing adequate structural integrity and durability to securely support the filter bag 44. However, rather than being formed of wire mesh material, the frame 46 can be of other constructions without departing from the spirit or scope of the present invention. For instance, the frame may be composed of perforated or expanded metal material.

The filter bag 44 is of substantially the same shape as the frame 46 and is designed to be engaged over the frame. The filter bag 44 has a closed upper end 104 coincident with the upper end of the frame 46 and has an open bottom end 106 engaged over the band 98. The filter bag 44 is of a length in the direction longitudinally along the frame 46 such that the lower edge of the bottom end 106 of the bag can be positioned to substantially coincide with the lower edge of the band 98. As noted above, the filter bag 44 is composed of a thin, air pervious material that allows air to pass through while trapping suspended particulate matter on the surface of the filter bag. Preferably, the filter bag 44 is constructed of a durable fabric material.

An elastic seal member 90 extends snugly around the combined band 98 and the open bottom end 106 of the filter bag 44 to secure the filter bag in place. Preferably, the elastic seal member 90 is a conventional O-ring. Two elastic seal members 90 ideally may be employed to more effectively secure the filter bag 44. Also, at times it may be desirable to use more than two elastic seal members 90, for instance, when the size of the frame 46 and associated filter bag 44 require that more support is needed to keep the frame 46 properly oriented within the receiving collar 40 and to maintain the frame in a vertically upright orientation. For purposes of simply sealing airflow, typically one elastic seal member 90 is adequate, but two seal members, as shown in FIG. 3, assist in holding the frame 46 vertically upright in the collar 40.

Ideally, the circular elastic seal members 90 have thicknesses somewhat greater than the clearance gap 108 which, as shown in FIG. 3, corresponds with the distance between the inside of the receiving collar 40 and the outside of the combined open end 106 of the filter bag 44 and the band 98 about which the filter bag is engaged over. If the preferred O-ring form of the elastic seal member 90 is employed, the above-described thickness is somewhat less than the cross-sectional diameter of the O-ring.

Ideally, the elastic seal member 90 is composed of a material(s) possessing substantial resiliency and capacity to withstand elevated temperatures. Resiliency is necessary so that the elastic seal member 90 expands through stretching during installation, constricts immediately thereafter to provide a snug fit, and resists fatigue or breakage over time. For moderate operational temperatures, a low durometer neoprene material is preferable. At high level temperatures, such as those found in asphalt plants, a silicone rubber material is preferable. The elastic seal member may be composed of composite materials, including metallic materials.

When the filter bag 44 is assembled on the frame 46 and surrounded by at least one elastic seal member 90, the resultant filter bag seal system 12 is simply insertable as a unit downward into the receiving collar 40 so that the lower edge of the band 98 rests on the upper surface of the ledge 42 extending around the opening 38 in the floor partition 28. In this installed condition, the seal members 90 form a snug, substantially, if not completely, airtight interconnection among the band 98, the lower end 106 of the filter bag 44 and the inside of the receiving collar 40. Because the elastic seal members 90 when properly sized exert significant clamping pressure on the open end 106 of the filter bag 44 and the underlying band 98, the seal members creep upwardly along the band 98 only a very short distance when the band, filter and seal members are inserted into a receiving collar 40. Additionally, as shown in FIG. 3, only a minute amount of filter bag creep 110 occurs during insertion of the filter bag seal system 12. Further, the frame 46 and its associated filter bag are supported in upright position within the bag house 10 without the need of any other method of support.

To remove the filter bag 44, and its associated frame 46, for instance when desiring to gain access to the interior of the bag house, the filter bag and frame together with the elastic seal members 90 are simply lifted upwardly as a unit from the receiving collar 90. No clamps or other types of hardward members need be disassembled.

The filter bag 44 may be conveniently and rapidly replaced in a similar manner. After the filter bag and its associated frame, together with the seal members, have been removed from the receiving collar, the seal members are simply rolled off the band 98 and the filter bag 44 slid off the underlying frame 46. A new bag is then slipped over the frame until its lower end 106 is substantially coterminous with the lower edge of the band 98 and then the elastic seal members 90 are rolled over the bottom end of the bag and the band. This assembly is then simply inserted downwardly into the receiving collar 40. No other assembly steps nor components, are required. As such, the present invention provides the substantial advantage of accomplishing a virtually airtight interconnection between the filter bag 44 and the collar 40 with the minimum components and assembly and disassembly steps.

Figure 4:
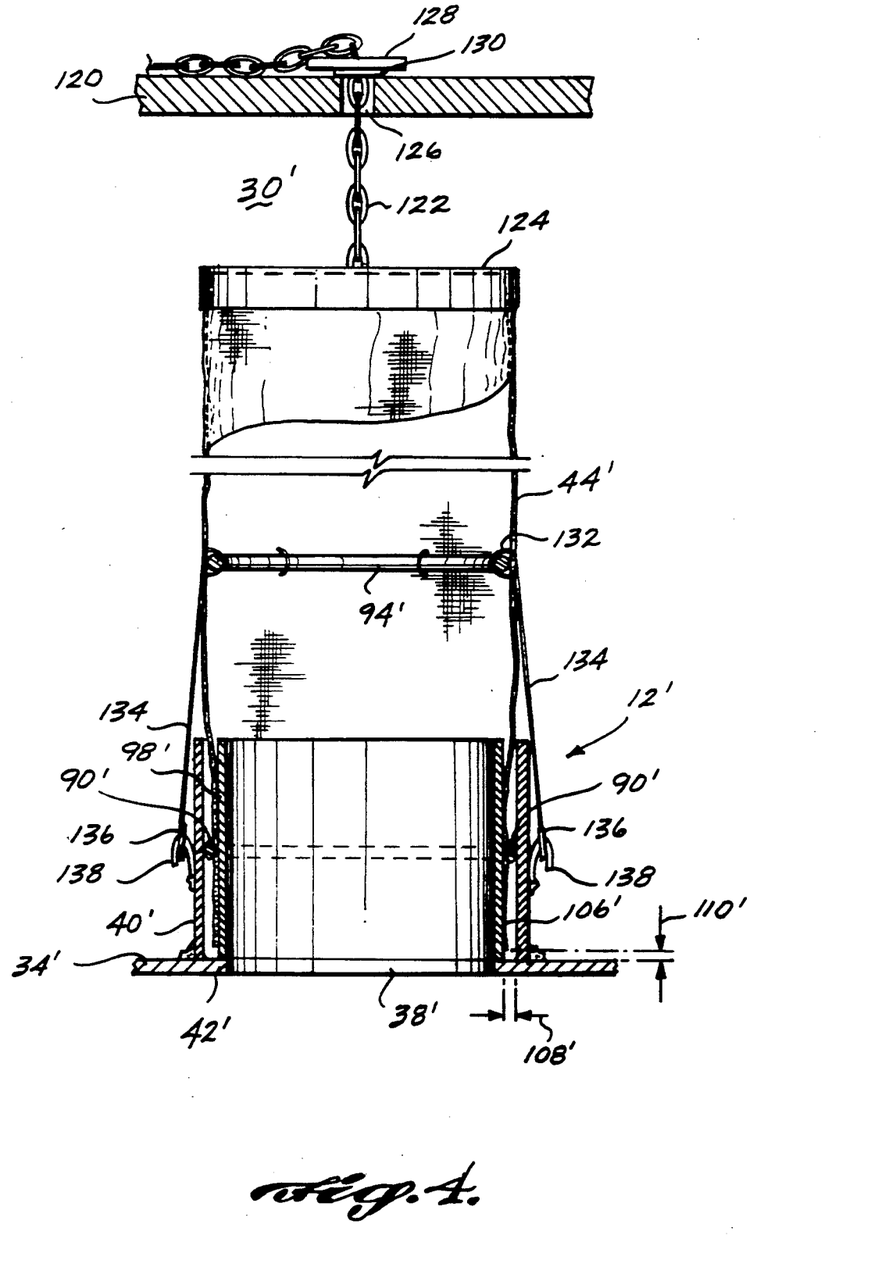
FIG. 4 is an enlarged, fragmentary, side elevational view, partially in cross section, of an alternative filter bag utilizing the seal system of the present invention.

FIG. 4 illustrates another filter bag construction utilizing the sealing system of the present invention. The components of the bag house, filter bag and seal system illustrated in FIG. 4 that correspond to the bag house 10, filter bag 44 and sealing system 12 illustrated in FIGS. 1-3 are identified with the same part numbers, but with the addition of the prime "'" designation.

The filter bag 44' illustrated in FIG. 4 is similar to the filter bag 44 shown in FIGS. 1-3, except that the filter bag 44' is suspended from an overhead grate structure 120 by a chain 122 attached to a circular cap 124 fixed to the upper, closed end of the filter bag 44'. The chain 122 extends upwardly through an opening 126 in the grate 120. A retaining pin 128 extends transversely through one of the links of the chain to support the chain relative to the grate. A washer 132, having a central opening through which the chain 122 extends, is disposed beneath the cross pin 128 for bearing against the upper surface of the grate 120 and the underside of the cross pin.

The cap 124 may be attached to the upper, closed end of the bag 44' by any convenient means. To prevent the bag 44' from collapsing when a suction force is applied to the interior of the bag, a plurality of spaced apart rings 94' are secured to the interior of the bag by any convenient means, for instance, by stitching 132. It will be appreciated that the rings 94' sufficiently support the bag 44' from collapsing when a suction is applied to the interior of the bag, but also allow the bag to collapse lengthwise when the support chain 122 is disengaged from the overhead grate 120.

The seal system 12' utilized to seal the open lower end of the bag 44' relative to the receiving collar 40' includes a band 98', which is similar to the band 98 shown in FIGS. 2 and 3, except that the band 98' is not attached to a frame structure. As with band 98 shown in FIGS. 2 and 3, ideally the diameter of the band 98' is somewhat larger than the diameter of the floor plate opening 38' but sufficiently smaller than the inside diameter of the receiver collar 40' to define a gap 108' between the inside diameter of the receiving collar 40' and the exterior of the bag open end 106' when disposed around the band 98'.

One or more elastic seal members 90' encircle the lower, open end 106' of the filter bag when engaged over the outside circumference of the band 98'. Ideally the elastic seal member(s) 90' have sufficient clamping strength to retain the lower end of the bag 44' and the band 98' securely together prior to insertion into the receiving collar 40'. With the lower end 106' of the filter bag 44' and the band 98' disposed within the receiving collar 40' a plurality of anchor straps 134 are used to anchor the lower end of the filter bag to the receiving collar. As illustrated, the upper end of the anchor straps are stitched or otherwise securely affixed to the filter bag, and a loop 136 is formed in the lower end of the anchor straps 134 to engage with a downwardly open hook 138 fixed to the exterior of the receiving collar 40'.

To install the filter bag 44', the band 98' is first inserted into open lower end 106' of the filter bag and secured thereto by one or more elastic seal members 90'. Thereafter, the band 98', together with the lower end 106' of the filter bag 44' is simply inserted downwardly into the receiving collar 40'. The chain 122 is extended through the opening 126 in the grate 120 and then the cross pin 128, with the washer 130 disposed below, is engaged with one of the links of the chain 122 to support the filter bag 44' in upright condition. The anchor straps 134 may be engaged with the hooks 138 before or after the chain 122 has been tightened.

To remove the filter bag 44', the chain 122 is simply disengaged from the grating 120 by removing the cross pin 128 thereby allowing the filter bag 44' to collapse downwardly. The straps 134 are simply disengaged from the hooks 138 and the lower end 106' of the filter bag and the band 98' are together simply pulled upwardly out of engagement from the receiving collar 40'.

It will be appreciated that the particulate matter that collects within the interior of the filter bag 44' is removed therefrom in the same manner as removed from the bag 44, discussed above. From the foregoing description of the construction and operation of the sealing system 12', it can be appreciated that this sealing system provides substantially the same advantages and improvements provided by the seal system 12 discussed above.

Figure 5:
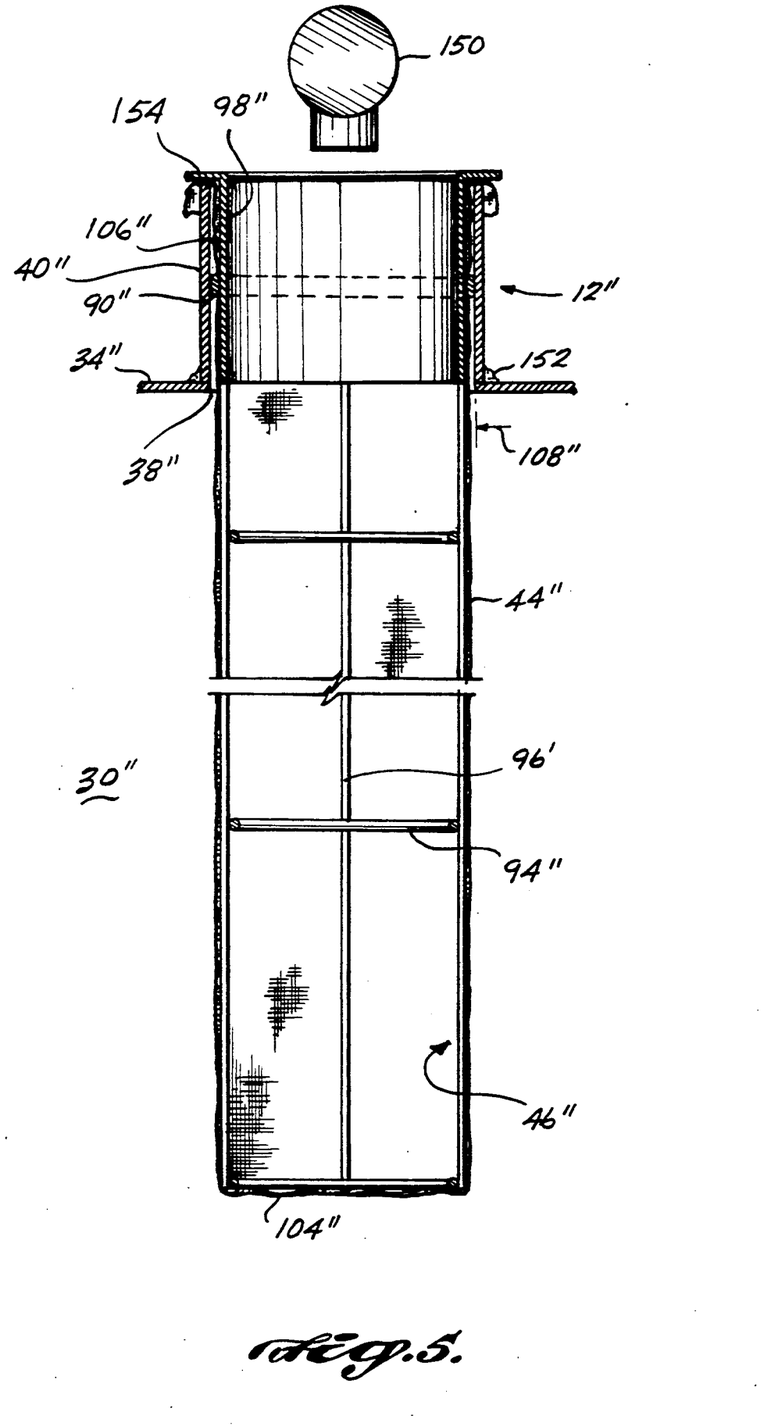
FIG. 5 is an enlarged, fragmentary, side elevational view, partially in cross section, illustrating further filter bag construction utilizing the seal system of the present invention.

A further preferred embodiment of the present invention is illustrated in FIG. 5, which discloses a sealing system 12'' for a filter bag 44'' constructed similar to that shown in FIGS. 1-3; however, the filter bag is suspended from overhead to extend downwardly into a filter chamber 30''. In FIG. 5, the components of the bag house 10'', filter bag 44'' and sealing system 12'' that correspond to the bag house 10, filter bag 44 and sealing system 12 illustrated in FIGS. 1-3 are identified with the same part numbers, except with the addition of a double prime "''" designation. In the configuration of the filter bag 44'', the particulate matter collects on the exterior of the filter bag, with the filtered air passing to the interior of the filter bag and then upwardly out through an opening 38'' in an overhead ceiling plate 34''. The particulate matter that collects on the exterior of the filter bag 44'' is periodically removed therefrom by directing pulses of high-pressure air from a delivery tube 150 downwardly into the filter bag. The particulate matter that dislodges from the exterior of the filter bag 44'' then falls to the bottom of the filter chamber 30' and into a cyclone (not shown) disclosed at the bottom of the filter chamber.

To describe the construction of the seal system 12'' shown in FIG. 5 in greater detail, a receiving collar 40'' extends around an opening 38'' formed in a partition ceiling 34''. The receiving collar 40'' is sized so that the inside diameter of the receiving collar closely approximates the diameter of the opening 38''. The receiving collar 40'' may be securely held in place by weldments 152 or other convenient methods.

A filter bag frame 46'' similar to the filter bag frame 46 shown in FIGS. 1-3, is employed to prevent the filter bag 44'' from collapsing. The filter bag frame 46'' depends downwardly from the lower edge of a circular band 98'' having a diameter substantially the same as the frame 46''. The band 98'' is of a height in the direction longitudinally of the frame 46'' that is substantially equal to the orthogonal distance, or height, that the receiving collar 40'' extends upwardly from the ceiling partition 34''. A flange 154 extends transversely from the upper edge of the band 98'' to overlap the upper edge of the receiving collar 40''. The flange 154 prevents the frame 46'' from falling through the receiving collar 40'' and the opening 38'' in the partition ceiling.

The filter bag 44'' is of substantially the same shape as the frame 46'' and is designed to be engaged over the frame. The filter bag 44'' has a closed lower end 104'' coincident with the lower end of the frame 46'' and has an open top end 106'' engaged over the band 98''. As with the filter bags 44 and 44' discussed above, ideally the filter bag 44" is composed of a thin, air pervious material that allows air to pass through while trapping suspended particulate matter on the outside surface of the filter bag.

An elastic seal member 90" extends snugly around the combined band 98" and the open upper end 106" of the filter bag 44" to secure the filter bag in place. The elastic seal member 90" is preferably of the same construction as the seal members 90 and 90' discussed above. Also, two or more elastic seal members 90" may be used to more effectively seal the filter bag 44".

The filter bag 44" is assembled on the frame 46" by simply slipping the filter bag over the frame. Thereafter, one or more elastic seal members 90" are rolled over the bag and underlying frame until the seal member is positioned around the band portion 98". This assembly is simply inserted downwardly into the receiving collar 40". When assembled in this manner, the elastic seal member 90" forms a substantially airtight seal among the receiving collar 40", the upper end 106" of the filter bag 44" and the band 98". No other assembly steps or components are required in this regard. The filter bag 44" is removed by simply reversing the foregoing steps.

As mentioned briefly above, the unfiltered air within the filtering chamber 30" passes from the exterior to the interior of the filter bag and then upwardly out the filtering chamber through the band 98". The particulate matter is collected on the exterior of the filter bag 44". This particulate matter is periodically removed from the filter bag by directing pulses of high pressure air from an overhead delivery tube 150 downwardly into the filter bag. The high pressure air forces the filter bag to expand to its maximum configuration which in turn causes the particulate matter that has collected onto the bag to be dislodged and fall downwardly to the bottom of the filtering chamber 30" for collection in a cyclone (not shown) or other structure located at the bottom of the filtering chamber. The delivery tube 150 preferably is adapted to rotate about the center of the bag house to sequentially direct pulses of high pressure air into the bags 44" disposed in circular arrays about the center of the bag house. Also, the delivery tube 150 may be swung out of the way when desiring to remove a filter bag 44" and its associated frame 46".

It will be appreciated that by the foregoing construction, the sealing system 12" provides substantially the same advantages and advances provided by the sealing systems 12 and 12' discussed above. More particularly, the sealing system 12" provides a substantially airtight interconnection among the receiving collar 40", the upper end 106" of the filter bag and the band 98" with the minimum of components and assembly and disassembly steps.

While preferred embodiments of the invention have been illustrated and described, it should be understood that variations can be made therein without departing from the spirit and scope of the invention. For example, the filter bag seal systems 12, 12' and 12" disclosed herein are not only applicable to bag house arrangement, differing from the one illustrated, but also are applicable to many other forms of filtering apparatus.

Also, many filtering apparatus utilize vibrational devices, rather than the suction and pulsed air devices disclosed herein, to remove particulate matter that has built up on the inside surface of the filter bags. While the closed ends 104, 104' and 104" of the filter bags 44, 44' and 44" and the adjacent portions of the frames 46, 46' and 46" may have to be redesigned for such vibrating devices, the opposite ends of the frames could remain identical to that disclosed in the present invention. Thus, the same sealing system as utilized in the present invention could be employed.

Additionally, the filter bag seal systems 12, 12' and 12" disclosed herein are applicable to frames and filter bags of other than those of elongated dimensions. Accordingly, it is to be understood that the invention is not to be limited to the specific embodiments illustrated and described. Rather, the true scope and spirit of the invention is to be determined by reference to the following claims.

The embodiments of the invention in which an exclusive property or privilege is claimed are defined as follows:

1. A filter bag seal system for a bag house having a filtering chamber and at least one opening to the filtering chamber in airflow communication with a supply of unfiltered air, the filter bag seal system comprising:
   a receiving collar surrounding the opening to the filtering chamber;
   an air pervious filter bag having an open end;
   frame means for supporting the filter bag against collapsing;
   a band extending around the interior of the open end of the filter bag and sized to be receivable together with the open end of the filter bag within the receiving collar to define a clearance gap between the inside of the receiving collar and the outside of the combined band and filter bag open end; and
   at least one detachable elastic seal member extending snugly around the periphery of the combined band and open end of the filter bag for securing the open end of the filter bag to the exterior of the band, the elastic seal member having a thickness sufficiently greater than the clearance gap to provide a substantially airtight seal between the filter bag engaged over the band and the receiving collar when the band, filter bag, and the elastic member are positioned within the receiving collar, the elastic seal member maintaining the combined filter bag and band in engagement with the receiving collar while enabling the combined filter bag and band to be removed from the receiving collar by simply slidably withdrawing in unison the combined filter bag and band from the receiving collar.

2. The filter bag seal system of claim 1, wherein the elastic seal member comprises an O-ring.

3. The filter bag seal system of claim 1, wherein the elastic seal member is constructed of a material possessing substantial resiliency and capable of withstanding elevated temperatures.

4. The filter bag seal system of claim 3, wherein the material is selected from the group consisting of a low durometer neoprene and silicone rubber.

5. The filter bag seal system of claim 1, further comprising a plurality of elastic seal members extending around the band of the frame and the open end of the filter bag.

6. The filter bag seal system of claim 1, wherein the filter bag is constructed of a fabric material.

7. The filter bag seal system of claim 1, wherein the frame and band are fixedly attached together, with the frame extending longitudinally from the band.

8. The filter bag seal system of claim 7, wherein the frame is of a mesh design.

9. The filter bag seal system of claim 7, wherein the band includes a transverse flange extending transversely outwardly from the circumference of the band a sufficient distance to overlap the receiving collar.

10. The filter bag seal system of claim 1, wherein the frame consists of a plurality of rings spaced apart along the length of the filter bag and secured to the filter bag to assist in preventing collapse of the filter bag.

11. The filter bag seal system of claim 1, wherein the height of the band in the direction longitudinally along the length of the band is substantially equal to the height of the receiving collar in the corresponding direction.

12. The filter bag seal system of claim 1, wherein the collar is disposed within the filtering chamber.

13. The filter bag seal system of claim 1, wherein the collar is disposed around the filter chamber opening on the side of the opening opposite the filtering chamber.

14. A filter bag seal system for a filtering apparatus having a filtering chamber and at least one opening to the filtering chamber in gas flow communication with a supply of unfiltered gas, the opening being surrounded by a receiving collar, the filter bag seal system comprising:
    a thin, gas pervious filter bag having an open end;
    frame means associated with the filter bag for supporting the filter bag against collapsing;
    a band sized to be closely engagable within the open end of the filter bag and receivable together with the open end of the filter bag within the receiving collar to define a clearance gap between the inside of the receiving collar and the outside of the combined band and filter bag open end; and,
    at least one detachable elastic seal member extending snugly around the open end of the filter bag and the band for securing the open end of the filter bag to the exterior of the band, the elastic seal member having a thickness greater than the clearance gap, whereby the filter bag assembled on the band and surrounded by the elastic seal member is insertable as a unit into the receiving collar to form a substantially gastight interconnection.

15. The filter bag seal system of claim 14, wherein the elastic seal member is substantially circular in cross section.

16. The filter bag seal system of claim 15, wherein the elastic seal member comprises an O-ring.

17. The filter bag seal system of claim 15, wherein the elastic seal member is constructed of a material possessing substantial resiliency and capable of withstanding elevated temperatures.

18. The filter bag seal system of claim 14, wherein the elastic seal member is composed of material selected from the group consisting of a low durometer neoprene, silicone rubber, and formed metal material.

19. The filter bag seal system of claim 14, further comprising a plurality of elastic seal members extending around the band and the open end of the filter bag.

20. The filter bag seal system of claim 14, wherein the frame means and the band are fixedly attached together, with the band constituting an extension of the frame means.

21. The filter bag seal system of claim 20, wherein the frame is of a mesh design.

22. The filter bag seal system of claim 20, further comprising a transverse flange extending transversely outwardly around the edge of the band opposite the frame a distance sufficient to overlap the collar.

23. The filter bag seal system of claim 14, wherein the frame includes a plurality of spaced apart rings and means for securing the bag to the rings to prevent collapse of the bag.

24. The filter bag seal system of claim 14, wherein the height of the band in the direction longitudinally along the bag is substantially equal to the height of the receiving collar in the corresponding direction.

25. A filter bag seal system for a bag house having a filtering chamber and at least one opening to the filtering chamber in airflow communication with a supply of unfiltered air, the filter bag seal system comprising:
    a receiving collar surrounding the opening to the filtering chamber;
    an air pervious filter bag having an open end;
    frame means for supporting the filter bag against collapsing;
    a band greater in diameter than the opening, the band extending around the interior of the open end of the filter bag and sized to be receivable together with the open end of the filter bag within the receiving collar to define a clearance gap between the inside of the receiving collar and the outside of the combined band and filter bag open end; and
    at least one detachable elastic seal member extending snugly around the periphery of the combined band and open end of the filter bag for securing the open end of the filter bag to the exterior of the band, the elastic seal member having a thickness sufficiently greater than the clearance gap to provide a substantially airtight seal between the filter bag engaged over the band and the receiving collar when the band, filter bag, and the elastic member are positioned within the receiving collar, the elastic seal member maintaining the combined filter bag and band in engagement with the receiving collar while enabling the combined filter bag and band to be removed from the receiving collar by simply slidably withdrawing in unison the combined filter bag and band from the receiving collar.

* * * * *

UNITED STATES PATENT AND TRADEMARK OFFICE
CERTIFICATE OF CORRECTION

PATENT NO. : 5,096,476
DATED : March 17, 1992
INVENTOR(S) : L. E. Hunsberger

It is certified that error appears in the above-identified patent and that said Letters Patent is hereby corrected as shown below:

| COLUMN | LINE | |
|---|---|---|
| 1 | 34 | after "Both" insert --the filter bag and frame have an open end to receive the gaseous stream. The open end of-- |
| 2 | 7 | "previous" should read --pervious-- |
| 6 | 50 | "hardward" should read --hardware-- |
| item [57] (Abstract) | 13 | "previous" should read --pervious-- |

Signed and Sealed this

Thirteenth Day of July, 1993

Attest:

MICHAEL K. KIRK

*Attesting Officer*     *Acting Commissioner of Patents and Trademarks*